United States Patent
Trebouet (10) Patent No.: US 12,391,218 B2
(45) Date of Patent: Aug. 19, 2025

(54) SYSTEM FOR CLEANING A SENSOR/TRANSMITTER OF A MOTOR VEHICLE

(71) Applicant: VALEO SYSTEMES D'ESSUYAGE, La Verriere (FR)

(72) Inventor: Marcel Trebouet, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 429 days.

(21) Appl. No.: 17/778,459

(22) PCT Filed: Nov. 30, 2020

(86) PCT No.: PCT/EP2020/083986
§ 371 (c)(1),
(2) Date: Nov. 10, 2022

(87) PCT Pub. No.: WO2021/115830
PCT Pub. Date: Jun. 17, 2021

(65) Prior Publication Data
US 2023/0126082 A1    Apr. 27, 2023

(30) Foreign Application Priority Data

Dec. 10, 2019  (FR) ..................................... 1914098

(51) Int. Cl.
*B60S 1/56* (2006.01)
*B60S 1/52* (2006.01)

(52) U.S. Cl.
CPC .. *B60S 1/56* (2013.01); *B60S 1/52* (2013.01)

(58) Field of Classification Search
CPC ...... B60S 1/54; B60S 1/66; B60S 1/52; G01S 2007/4977; G01S 17/931; B08B 3/02; G02B 27/0006

(Continued)

(56) References Cited

U.S. PATENT DOCUMENTS

| 4,088,358 A | 5/1978 | Hirsch |
| 10,207,684 B2 | 2/2019 | Villa-Real |

(Continued)

FOREIGN PATENT DOCUMENTS

| CN | 106740708 B | 6/2019 |
| CN | 109923006 A | 6/2019 |

(Continued)

OTHER PUBLICATIONS

Japan Patent Office, Office Action(with English translation) of corresponding Japanese Patent Application No. 2022-535238, dated May 7, 2024.

(Continued)

*Primary Examiner* — Katina N. Henson
(74) *Attorney, Agent, or Firm* — Valeo Systemes d'Essuyage (57) ABSTRACT

The invention relates to a system for cleaning a sensor/transmitter of a motor vehicle, comprising holes for spraying a first fluid onto the sensor/transmitter an openings for spraying a second fluid onto the sensor/transmitter, the second fluid being different from the first fluid, the cleaning system also comprising a guide body for guiding the first fluid and the second fluid respectively to holes for spraying the first fluid and openings for spraying the second fluid. The guide body of the cleaning system according to the invention comprises a first supply portion, configured to be connected to a source of the second fluid, and a second distribution portion comprising pipes for conveying the second fluid that lead to the openings for spraying it, and a pipe for distributing the first fluid arranged substantially perpendicular to the pipes for conveying the second fluid.

11 Claims, 6 Drawing Sheets

(58) Field of Classification Search
USPC .......................................................... 15/320
See application file for complete search history.

(56) References Cited

U.S. PATENT DOCUMENTS

| | | | |
|---|---|---|---|
| 10,604,122 B2 | 3/2020 | Kubota et al. | |
| 11,305,737 B2 | 4/2022 | Baudouin et al. | |
| 11,458,933 B2 | 10/2022 | Grasso et al. | |
| 11,945,415 B2 | 4/2024 | Hayashi et al. | |
| 2016/0244028 A1* | 8/2016 | Wakatsuki | B08B 1/165 |
| 2018/0265049 A1 | 9/2018 | Schmidt et al. | |
| 2018/0361997 A1 | 12/2018 | Schmidt et al. | |
| 2019/0184942 A1* | 6/2019 | Vaishnav | G05D 1/0088 |
| 2019/0314865 A1* | 10/2019 | Sevak | G02B 27/0006 |
| 2019/0337489 A1 | 11/2019 | Baldovino et al. | |

FOREIGN PATENT DOCUMENTS

| | | |
|---|---|---|
| CN | 109923007 A | 6/2019 |
| JP | 2000351356 A | 12/2000 |
| JP | 2014000949 A | 1/2014 |
| JP | 2014008868 A | 1/2014 |
| JP | 2016011091 A | 1/2016 |
| JP | 2018076075 A | 5/2018 |
| JP | 2019077383 A | 5/2019 |
| JP | 2019172085 A | 10/2019 |

OTHER PUBLICATIONS

European Patent Office, International Search Report (with English translation) and Written Opinion of corresponding International Application No. PCT/EP2020/083986, dated Feb. 4, 2021.
China Patent Office, Office Action (with English translation) and Search Report of corresponding Chinese Application No. 202080094788.0 dated Apr. 30, 2025, 11 pages.

* cited by examiner

SYSTEM FOR CLEANING A SENSOR/TRANSMITTER OF A MOTOR VEHICLE

CROSS-REFERENCE TO RELATED APPLICATIONS

This application is filed under 35 U.S.C. § 371 U.S. National Phase of International Application No. PCT/EP2020/083986 filed Nov. 30, 2020 (published as WO2021115830), which claims priority benefit to French application No. 1914098 filed on Dec. 10, 2019, the disclosures of which are herein incorporated by reference in their entirety.

TECHNICAL FIELD

The present invention relates to the field of driving aid devices and, more particularly, to the field of the detection assemblies used for this purpose. The invention relates more particularly to the cleaning devices for cleaning a sensor/transmitter of such detection assemblies.

BACKGROUND OF THE INVENTION

Such sensors/transmitters are being fitted on an increasingly large number of motor vehicles in order to assist the driver of the vehicle in certain driving situations, for example to provide the driver with a parking aid or provide a lane departure warning. In order for this assistance to be as effective as possible, the data supplied and/or transmitted by the sensor/transmitter have to be of the best possible quality, and it is therefore essential to have transmission and reception surfaces that are clean in order to perform the corresponding data acquisitions and transmissions. This requirement is all the more important in the case of autonomous vehicles where the vehicle is controlled on the basis of the information gathered by such sensors/transmitters.

BRIEF SUMMARY OF THE INVENTION

In order to achieve this, a device for cleaning a transmission and reception surface of the sensor/transmitter (for example the lens of an image capturing camera, or a window protecting such a lens, in the case of an optical sensor) may be commanded to inject a cleaning fluid onto said transmission and reception surface. To complement this, a stream of air or of another drying fluid may be sprayed onto the surface after the cleaning fluid, so as to rid this surface of the cleaning fluid and of the dirt that said fluid carries with it. Such cleaning devices therefore comprise means for conveying and distributing the cleaning fluid and the drying fluid. These cleaning devices must not, however, impair the operation of the sensor/transmitter, and they must be as compact as possible in order to conform to vehicle space constraints. To this end, it is possible to use a dispenser capable notably of commanding alternating admission, into a head that admits and dispenses the cleaning and drying fluids, of one or other of the aforementioned fluids. Such assemblies may also employ telescopic devices configured to move from a retracted rest position to a deployed cleaning/drying position. Such configurations however generate high operating costs, notably because of the cost of the kinematic means that they involve.

It is an object of the present invention to propose a device for cleaning a motor vehicle sensor/transmitter which has reduced costs of manufacture and of operation, which is easy to install at any point on a vehicle, where constraints on space are complex, and which at the same time maintains the effectiveness of the cleaning and of the drying of the sensor/transmitter concerned.

To this end, one subject of the invention is a cleaning system for cleaning a motor vehicle sensor/transmitter, comprising on the one hand spray orifices for spraying a first fluid onto the sensor/transmitter and, on the other hand, spray openings for spraying a second fluid onto the sensor/transmitter, the second fluid being distinct from the first fluid, the cleaning system also comprising a guide body guiding the first fluid and the second fluid respectively toward the first-fluid spray orifices and the second-fluid spray openings, characterized in that the guide body comprises a supply first part, configured to be connected to a source of the second fluid, and a distribution second part comprising, on the one hand, second-fluid conveying ducts opening onto the second-fluid spray openings and, on the other hand, a first-fluid distribution duct arranged substantially perpendicular to the second-fluid conveying ducts.

It must be understood that the spraying of fluid onto a sensor/transmitter notably consists in spraying this fluid onto a transparent surface positioned facing the sensor/transmitter and, for example, an optical surface of an image capturing camera or else a surface of a transparent material protecting such an optical surface.

In the context of the invention, the first fluid is advantageously a fluid for cleaning a transparent surface, for example a liquid product such as water or a washer fluid. The cleaning fluid may also be gaseous or take the form of a mixture of gas and of liquid. Advantageously, the second fluid is a drying fluid the purpose of which is to remove from the surface the cleaning fluid in which the dust and dirt present on this surface before cleaning has been trapped. In the context of the invention, the drying fluid is advantageously a gas, for example air, which is made to circulate by a blower.

The term "spray orifice" should be understood here in the broad sense: according to various examples, cleaning-fluid spray means may comprise several distinct spray orifices, for example circular orifices, or they may comprise one or more elongate spray orifices. In all instances, the invention plans for the dimensions of the spray orifices for the first fluid, or cleaning fluid, to be small so as to increase the pressure at which this fluid is sprayed and thus obtain a jet effect that adds a mechanical component to the chemical cleaning performed by the composition of the cleaning fluid. In the cleaning system according to the invention, the cleaning-fluid spray orifices are arranged along a cleaning-fluid distribution duct, in a direction which will be referred to in what follows as a longitudinal direction of the cleaning system according to the invention.

In a similar way to the cleaning-fluid spray orifices, the term "spray opening" must be understood in the broad sense, namely that the drying-fluid spray region may comprise several distinct spray openings, for example circular openings, or may comprise one or more elongate spray openings.

Advantageously, the end of the conveying ducts forming the spray openings is situated in the vicinity of the cleaning-fluid spray orifices: this region will, in what follows, be referred to as the spray region of the cleaning system according to the invention.

In the cleaning system according to the invention, the cleaning fluid and the drying fluid are guided as far as the spray region by guide body which notably comprises a first part configured to be connected to a source of the second fluid, which is to say in this instance to the blower that generates the stream of drying air.

According to the invention, the guide body also comprises a distribution second part, attached to the supply first part of the guide body. According to the invention, this distribution second part comprises, on the one hand, ducts conveying the drying fluid as far as the drying-fluid spray openings and, on the other hand, the cleaning-fluid distribution duct in which the cleaning-fluid spray orifices are formed, said distribution duct being arranged substantially perpendicular to the drying-fluid conveying ducts.

More specifically, the spray region extends at one end of the distribution second part of the guide body which is the opposite end, in the direction in which the drying fluid circulates in the distribution second part, from the end via which this second part is attached to the supply first part of the guide body. In other words, the distribution second part of the guide body extends between the spray region and an end of the supply first part of the guide body that is the opposite end, in the direction in which the drying fluid circulates, from the end via which this supply first part of the guide body is connected to the source of drying fluid.

With reference to the longitudinal direction of the cleaning system according to the invention, the main direction of circulation of the drying fluid in the distribution second part of the guide body, substantially perpendicular to this longitudinal direction, will be referred to in what follows as the vertical direction of the cleaning system according to the invention. This direction is also the main direction of elongation of the drying-fluid conveying ducts in the distribution second part of the guide body of the cleaning system according to the invention.

According to a complementary feature of the invention, a wall of the first-fluid, which is to say cleaning-fluid, distribution duct contributes to delimiting the second-fluid, which is to say drying-fluid, conveying ducts, in the spray region. In other words, in the cleaning system according to the invention, the cleaning-fluid spray orifices and the drying-fluid spray openings feature, in the spray region, a wall in common. According to the invention, this common wall is arranged between the cleaning-fluid spray orifices and the drying-fluid spray openings, which is to say that it is situated in the vicinity, respectively, of the cleaning-fluid distribution duct and of the ends of the drying-fluid conveying ducts.

More specifically, the drying-fluid spray openings are situated on that side of the cleaning system according to the invention towards which the cleaning-fluid spray orifices are directed. In other words, when the cleaning system according to the invention is installed on a vehicle, in the vicinity of a sensor/transmitter, the drying-fluid spray openings are positioned between the cleaning-fluid spray orifices and the surface that is to be cleaned, the cleaning-fluid spray orifices being logically directed toward this surface. The drying fluid is therefore sprayed between the surface that is to be cleaned and the spray of the cleaning fluid, thereby making it possible to improve the compactness of the cleaning system while at the same time maintaining the effectiveness of the assembly, the drying fluid thus being sprayed as close as possible to the surface that is to be cleaned and allowing complete removal of the cleaning fluid laden with dust and dirt.

The invention may also exhibit one or more of the following features, taken individually or in combination:
- the conveying ducts open onto spray openings and the distribution second part of the guide body has a dimension, measured in the longitudinal direction of the cleaning system that differs between an edge connecting with the supply first part of the guide body and an edge comprising the second-fluid, which is to say drying-fluid, spray openings. In other words, the distribution second part is such that, on the one hand, it is able to extend, without a sharp increase in the bore section, the supply first part, which is small in size in order to make it easier to install in a reduced amount of space and such that, on the other hand, it enables the creation of a spray region of which the longitudinal dimension, along which the first-fluid spray orifices and the second-fluid spray openings are arranged, is great, thus allowing the cleaning/drying of an extensive surface or the cleaning/drying of a plurality of surfaces of different sensors/transmitters positioned close to one another.
- the second-fluid spray openings are uniformly distributed along a direction of elongation of the distribution second part, substantially parallel to a longitudinal direction of the cleaning system. This improves the uniformity of the distribution of the second fluid in the spray region of the cleaning system according to the invention.
- the cleaning system according to the invention comprises a base configured to be secured to a structure of the vehicle, and a casing configured to cover the base. It is appropriate here to draw a clear distinction between the base and the casing of the supply first part and of the distribution second part of the guide body. According to the invention, the base and the casing together form the entirety of the guide body. According to one example, the supply first part of the guide body is made up of a first portion of the casing, and the distribution second part of the guide body is made up of the covered base and of a second portion of the casing. Alternatively, the base and casing may together form the supply first part and the distribution second part of the guide body of the cleaning system according to the invention. According to one example, the base comprises means of attachment to a structure of the vehicle, for example a bodywork or bodywork protection element, such as a bumper. According to such an example, the base advantageously takes the overall form of a thin sheet of which the shape compliments that of the element of the vehicle structure to which the base is intended to be secured. This notably allows the base to be fitted without altering the overall look of the vehicle. According to another example, the base is made as one with an element of the vehicle structure such as the aforesaid. In all cases, the casing advantageously comprises several walls which together delimit a cavity of which the base constitutes a closing wall when the base and the casing are assembled to form the guide body of the cleaning system according to the invention.
- the casing comprises a first portion configured to be connected to the source of the second fluid, and a second portion configured to form, with the base, the distribution second part of the guide body, the first portion and the second portion making between them a non-zero angle. The result of the foregoing is that the first portion of the casing makes a non-zero angle with the plane defined by the longitudinal direction and the vertical direction of the cleaning system according to the invention. According to one example, the first portion of the casing extends in an overall direction substantially perpendicular to the second portion of the casing and to the distribution second part of the guide body; in what follows, this direction will be referred to as the transverse direction of the cleaning system according to the invention. Such a configuration notably allows the drying-fluid source, to which the first portion of the casing is connected, to be installed in a region close to the sensor/transmitter equipped with the cleaning system according to the invention, but not visible to a user looking at such a sensor/transmitter. Such a configuration therefore makes it easier for the cleaning system according to the invention to be installed in an environment such as, for example, that of a side of a vehicle.

the second-fluid conveying ducts are delimited by ribs projecting out from an exterior surface of the base and an interior surface of the casing which surface is intended to be in contact with the free end of the ribs. With reference to the transverse direction of the cleaning system according to the invention, the inside refers to a region situated, in the transverse direction, on the same side as the surface that is to be cleaned, and the outside refers to a region situated, in the transverse direction, on the opposite side to the surface that is to be cleaned. According to the feature of the invention mentioned here, the ribs, arranged to project in the transverse direction of the cleaning system, from the exterior surface of the base, form a plurality of transverse partitions extending within the cavity defined by the walls of the casing. According to the invention, the dimensions, in the transverse direction, of these partitions are defined so that when the casing is placed to cover the base to form the distribution second part of the guide body, an interior surface of the cavity defined by the walls of the casing comes to bear against the thickness of each of these partitions, thus forming the conveying ducts in which the drying fluid circulates. Advantageously, in order to avoid any leak of drying fluid from one conveying duct to another, the interior surface of the cavity delimited by the walls of the casing is smooth. More specifically, this surface may be polished for better sealing of each drying-fluid conveying duct.

the ribs delimit, in the distribution second part of the guide body, conveying ducts which are inclined with respect to the longitudinal direction and to the vertical direction of the cleaning system. More specifically, a rib contributes to delimiting two adjacent drying-fluid conveying ducts, which means to say that this rib is common to these two conveying ducts. In addition, all the conveying ducts are grouped together in the supply first part of the guide body, which part is connected to the source of drying fluid. The complex and inclined shape of these ribs is the result of the configuration of the distribution second part of the guide body of the cleaning system, and more particularly of the increase in the longitudinal dimension of this distribution second part from the first part as far as the spray openings.

each second-fluid spray opening is delimited, in the longitudinal direction of the cleaning system according to the invention, by the free ends of two ribs that contribute to delimiting the corresponding conveying duct. In other words, each drying-fluid spray opening is formed at the opposite end of the corresponding conveying duct to the end via which this conveying duct originates in the supply first part of the guide body.

the second-fluid conveying ducts are narrowed at the end via which the second fluid is sprayed from them. What that means to say is that the dimensions of each drying-fluid spray opening are less than the mean dimensions of the conveying duct of which this spray opening forms one end, the dimensions being measured in cross section on a plane perpendicular to the main direction of elongation of the conveying duct concerned. This makes it possible to increase the pressure at which the drying fluid is sprayed, and obtain a jet effect improving the effectiveness of the drying performed.

the casing comprises a groove to accept a first-fluid distribution pipe in which a plurality of first-fluid spray orifices is arranged. This groove, together with the distribution pipe, forms the first-fluid distribution duct. According to one example, the distribution pipe is forcibly inserted into the groove and prevented from rotating therein so that the orientation of the cleaning-fluid spray orifices with respect to the surface that is to be cleaned remains constant. According to one example, the distribution pipe may be prevented from rotating by engaging a lug arranged in the groove in a recess made in the surface of the distribution pipe.

the casing comprises a first-fluid distribution duct of closed cross section and in which a plurality of first-fluid spray orifices is arranged. This makes it possible, by eliminating the distribution pipe, to limit the number of components in the cleaning system according to the invention and, therefore, the cost thereof. Furthermore, it simplifies assembly and installation of the cleaning system according to the invention while at the same time improving the repeatability of the orientation and of the maintained orientation of the cleaning-fluid spray orifices facing the surface that is to be cleaned.

BRIEF DESCRIPTION OF THE DRAWINGS

Other features, details and advantages of the invention will become more clearly apparent upon reading the description given below by way of indication, with reference to the drawings, in which.

DETAILED DESCRIPTION OF THE INVENTION

It should first of all be noted that although the figures set out the invention in detail for implementing the invention, these figures may of course be used in order to better define the invention if necessary. It should also be noted that these figures set out only one possible exemplary embodiment of the invention.

Figure 1:
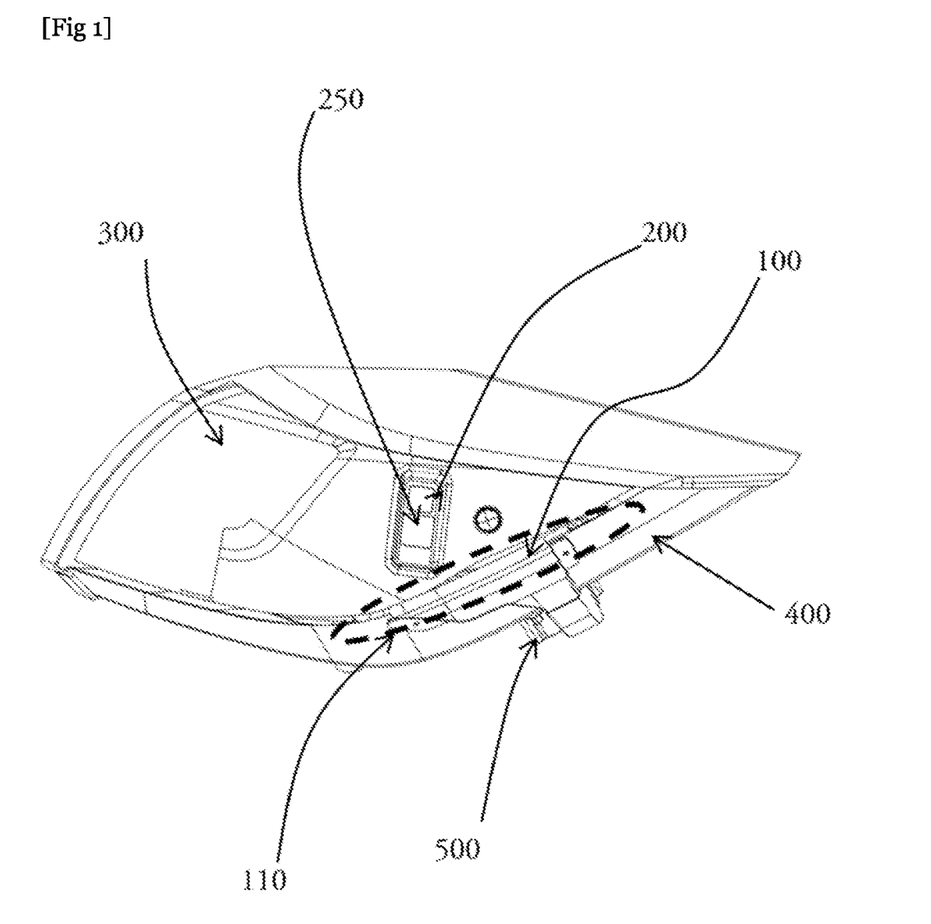
FIG. 1 is a schematic perspective general view of a motor vehicle headlamp equipped with one exemplary embodiment of a cleaning system according to the invention.

FIG. 1 schematically illustrates one exemplary embodiment of a cleaning system 100 according to the invention in its application to the cleaning of the surface 250 of a sensor/transmitter 200 intended to be fitted to a motor vehicle headlamp 300.

In what follows, the sensor/transmitter 200 will be described in greater detail as being an optical detection device such as those known by the acronym LIDAR (Laser/Light Detection and Ranging) configured to emit a light or laser beam and to analyze the light or laser beam reflected by an obstacle situated in the vicinity of the sensor/transmitter 200. Such a sensor/transmitter 200 comprises an optical surface 250 the state of cleanliness of which dictates the quality of the detection achieved. According to various examples, the surface 250 may be a transmitting/detecting surface of the sensor/transmitter 200 or a transparent window protecting such an a transmitting/detecting surface. It should be noted that what follows is applicable irrespective of the type of sensor/transmitter selected and of the type of associated detection system.

As shown in FIG. 1, the cleaning system 100 according to the invention is attached to an element 400 of the vehicle structure, in the vicinity of the headlamp 300 and of the sensor/transmitter 200. More specifically, as FIG. 1 shows, the cleaning system 100 more or less conforms to the shape of the structure element 400 in the region in which it is installed, so that it does not appreciably alter the look of the headlamp 300 and of the structure element 400 in the region in which it is installed. According to one example, a casing, not depicted in FIG. 1, may be attached to the structure element 400 and to the cleaning system 100 in order to camouflage the latter from a user looking at the headlamp 300. It should be noted that the particular shape of the cleaning system 100 also allows a blower 500 that forms part of the cleaning system, as will be described in greater detail hereinafter, to be installed in a region of the headlamp 300 that is not very visible to a user looking at the headlamp 300, while still being close to the spray region 110.

The cleaning system 100 is configured to spray, onto the surface 250 that is to be cleaned, on the one hand, a first fluid, or cleaning fluid, intended to remove from the surface 250 that is to be cleaned the dust and dirt that may have become deposited thereon and, on the other hand, a second fluid, or drying fluid, chosen to allow quick removal of the cleaning fluid, laden with dust and dirt, from the surface 250 that is to be cleaned, without leaving traces thereon. The cleaning fluid is, for example, a liquid such as water or a washer fluid. According to the example more particularly illustrated in FIG. 1, the drying fluid is air circulated by the blower 500 schematically indicated in FIG. 1.

The cleaning fluid and the drying fluid are sprayed onto the surface 250 that is to be cleaned from a spray region 110 of the cleaning system 100, which region will be detailed later on, with reference to the subsequent figures.

Figure 2:
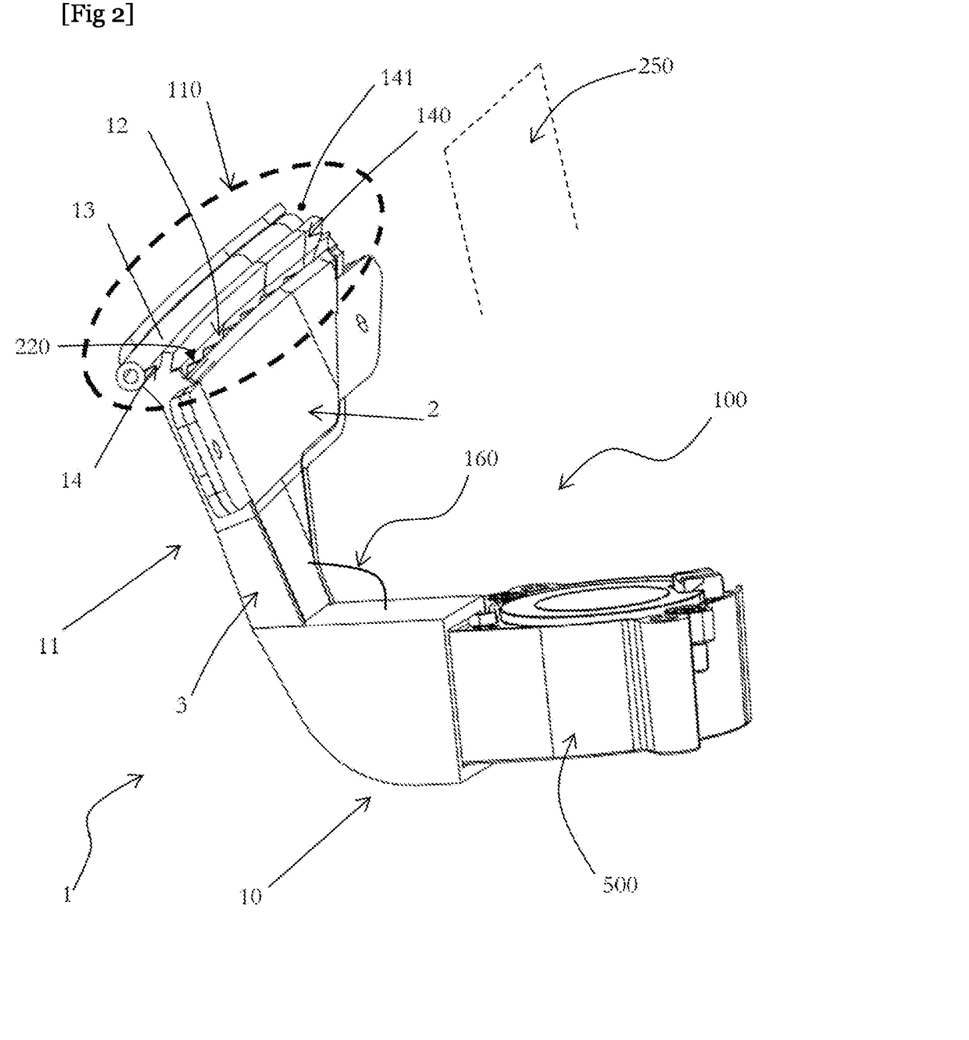
FIG. 2 is a schematic perspective view of a cleaning system like the one illustrated in FIG. 1.

FIG. 2 is a schematic perspective view of a cleaning system 100 according to the invention like the one illustrated in FIG. 1. The surface 250 that is to be cleaned is schematically indicated in dotted line in this figure.

The cleaning system 100 comprises a supply first part 10, configured to be connected to the blower 500, and a distribution second part 11, which at its opposite end to the supply first part 10 comprises the spray region 110. The first part 10 and the second part 11 extend continuously so as together to form a guide body 1 of the cleaning system 100. As FIG. 2 shows, the supply first part 10 of the guide body 1 is connected to the blower 500 at one end along its main direction of extension and is connected, at its opposite end in this main direction of extension, to the distribution second part 11 of the guide body 1. Arbitrarily, the direction of elongation of the distribution second part 11, in which direction this part mainly extends between its junction with the supply first part 10 and the spray region 110 will be referred to in what follows as the vertical direction V of the cleaning system 100. To complement this, the term "lower" will refer, in what follows, to that end of the distribution second part 11, in the vertical direction V, via which this second part is attached to the supply first part 10, and the term "upper" will refer, in what follows, to that end of the distribution second part 11, in the vertical direction V, in which the spray region 110 is situated.

In the spray region 110, the second part 11 of the guide body 1 comprises, on the one hand, drying-fluid spray openings 12 and, on the other hand, a cleaning-fluid distribution pipe 13. The cleaning-fluid distribution pipe 13 is advantageously pierced with a plurality of cleaning-fluid spray orifices 130, which are not depicted in FIG. 2. According to one example, the cleaning-fluid spray orifices 130 are uniformly distributed along the distribution pipe 13.

According to the example more particularly illustrated in FIG. 2, the cleaning-fluid distribution pipe 13 is inserted in a substantially cylindrical groove 14 arranged at the upper vertical end of the distribution second part 11 of the guide body 1. More specifically, according to this example, the groove 14 is arranged in a substantially cylindrical shape 140 which comprises an axially extending slot 141, which is to say a slot extending parallel to the axis of elongation of the substantially cylindrical shape, which uncovers a portion of the cleaning-fluid distribution pipe 13. The distribution pipe 13, the groove 14 and the substantially cylindrical shape 140, which are coaxial, together form a cleaning-fluid distribution duct. Advantageously, the cleaning-fluid distribution pipe 13 is inserted into the groove 14 in such a way that the part of this distribution pipe in which the cleaning-fluid spray orifices 130, not depicted in FIG. 2, are arranged, faces the slot 141, so as to allow the cleaning fluid to be sprayed onto the surface 250 that is to be cleaned.

By convention, the main direction of extension of the groove 14, of the substantially cylindrical shape 140 and of the cleaning-fluid distribution pipe 13 will be referred to in what follows as the longitudinal direction L of the cleaning system 100 according to the invention. It should be noted that this direction may have any orientation with respect to the longitudinal direction of a vehicle equipped with the cleaning system 100 according to the invention, and that it is substantially perpendicular to the vertical direction V.

The result of the foregoing is that the distribution second part 11 of the guide body 1 therefore extends chiefly in the longitudinal direction L and the vertical direction V. It should be noted that the notions of planes or of directions should here, and in the foregoing and in what follows, be understood in the broad sense. Specifically, as indicated hereinabove, the shapes of the elements that make up the cleaning system 100 are defined to conform as closely as possible to the shapes of the vehicle in the region in which the cleaning system 100 is installed, so as to allow the system to be installed in a way that does not detract from the look of the vehicle in this region. The notion of a "plane" in which all or part of an element of the cleaning system 100 extends should therefore here, and in the foregoing and in what follows, be understood as being the plane closest to the surface of the element concerned. Similarly, the notion of a "direction" in which all or part of an element of the cleaning system 100 extends should therefore here, and in the foregoing and in what follows, be understood as being the linear direction closest to the direction in which the element concerned extends.

The supply first part 10 of the guide body 1 makes, with the distribution second part 11, a non-zero angle 160. According to the example more particularly illustrated in FIG. 2, the supply first part 10 of the guide body makes, with the distribution second part 11 thereof, an angle 160 close to 90 degrees. By convention, the main direction of elongation of the supply first part 10 of the guide body 1, which is substantially perpendicular to the longitudinal direction L and to the vertical direction V, will be referred to in what follows as the transverse direction T of the cleaning system 100. It should be noted that such a configuration allows the blower 500 that forms the source of drying fluid to be offset away from the spray region 110 in which this drying fluid is sprayed. This makes the cleaning system 100 easier to install on the vehicle.

With reference to the aforementioned directions and orientations, the term "interior" will refer, in what follows, to that side of the cleaning system 100 that is closest, in the transverse direction T, to the end of the supply first part 10 via which this part is connected to the blower 500. The term "exterior" will refer, in what follows, to that side of the cleaning system that is situated on the opposite side, in the transverse direction T, from the end of the supply first part 10 via which this part is connected to the blower 500. By extension, the term "interior" will refer to an element of the cleaning system 100 which, in the transverse direction T, is situated on the same side as the surface 250 that is to be cleaned, and the term "exterior" will refer to an element of the cleaning system 100 situated on the opposite side from the surface 250 that is to be cleaned, in the transverse direction T of the cleaning system 100.

The supply first part 10 of the guide body 1 more or less forms a hollow duct configured to convey the drying fluid circulated by the blower 500 as far as the distribution second part 11 of the guide body 1, the two parts of the guide body communicating in order to allow the drying fluid to pass from the first part to the second part.

According to the invention, the drying fluid is conveyed, in the distribution second part 11 of the guide body 1, through a plurality of conveying ducts 15, not visible in FIG. 2, each of which, at its end situated in the spray region 110, forms one of the spray openings 12.

A longitudinal dimension of the distribution second part 11 of the guide body 1, measured in the longitudinal direction L of the cleaning system 100, increases from the lower vertical end of the distribution second part 11, via which this part is connected to the supply first part 10, as far as the spray region 110. More specifically, this longitudinal dimension increases in such a way that a dimension, measured in the longitudinal direction L, of that part of the spray region 110 in which the drying-fluid spray openings 12 extend, is far greater than a dimension, measured in the longitudinal direction L, of the region of connection between the first and second parts of the guide body.

Figure 3:
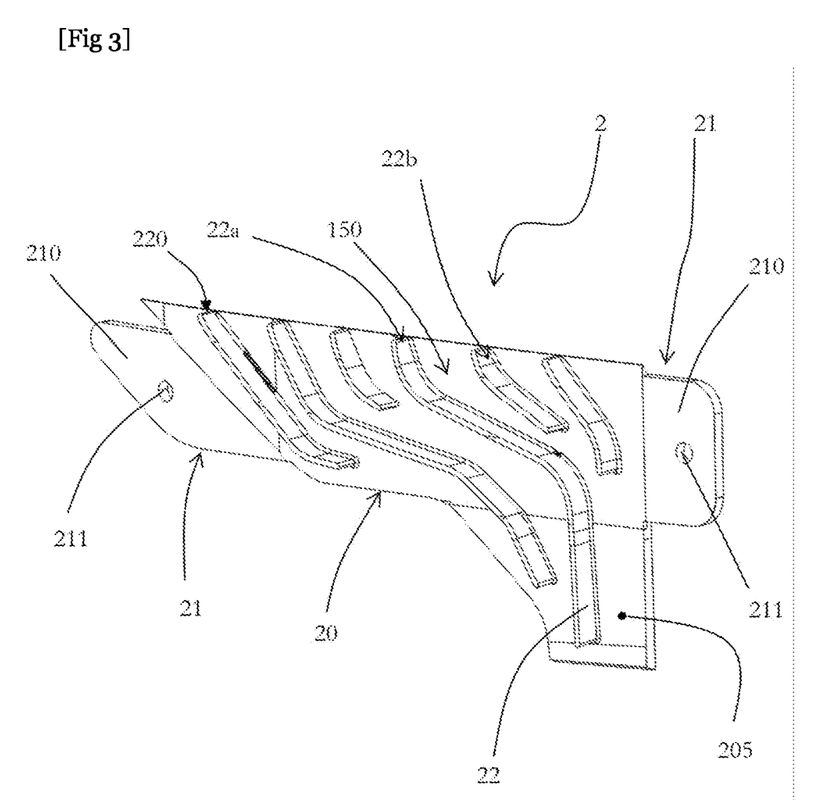
FIG. 3 is a schematic perspective view of one exemplary embodiment of the base of a cleaning system like the one illustrated in FIG. 2.

Each conveying duct 15 therefore follows, between the spray opening 12 situated at one of its ends, and the end of the distribution second part 11, via which this part is attached to the supply first part 10, a complex path along which they extend, from the upper end to the lower end of the distribution second part 11 of the guide body 1, being, on the one hand, substantially perpendicular to the cleaning-fluid distribution pipe 13 and to the distribution duct that this pipe forms with the groove 14 and the substantially cylindrical shape 140 and, on the other hand, inclined with respect to the vertical direction V of the cleaning system 100, as is more clearly visible in FIG. 3 which illustrates a base of the second part contributing to delimiting these conveying ducts 15.

Advantageously, the complex paths of the drying-fluid conveying ducts 15 are defined in such a way that the spray openings 12 for this fluid, which in the spray region 110 form the ends of the conveying ducts 15, are substantially uniformly distributed along the dimension, in the longitudinal direction L of the cleaning system 100, of the spray region 110.

According to the invention, the guide body 1 comprises a base 2 and a casing 3 which, positioned to cover the base 2 in the transverse direction T of the cleaning system 100, forms, with said base 2, the distribution second part 11 of the guide body 1. According to the example more particularly illustrated in FIG. 2, with reference to the directions and orientations defined hereinabove, the base 2 forms the interior side of the distribution second part 11 of the guide body 1. According to this example, the casing 3 forms, on the one hand, the supply first part 10 of the guide body, and on the other hand covers the base 2 in order therewith to form the distribution second part 11 of the guide body. More specifically, the base 2 and the casing 3 form, in the distribution second part 11 of the guide body, a cavity in which the drying-fluid conveying ducts 15 are arranged, as will now be detailed with reference to FIGS. 3 and 4.

FIG. 3 illustrates one embodiment of the base 2 of the cleaning system 100 depicted in FIG. 2.

The base 2 comprises a plate 20 of complex shape, which here has the overall shape of an L of which a base, here vertical, contributes to forming the lower part of the distribution second part 11 of the guide body 1 and of which an extension, here longitudinal, contributes to forming the upper end of the distribution second part 11 of the guide body 1 and the spray region 110.

According to the example illustrated in FIG. 3, the base 2 comprises fixing means 21 for fixing to an element of the vehicle structure such as the structure element 400 previously mentioned and not depicted in FIG. 3. According to the example illustrated in FIG. 3, the fixing means 21 comprises two tabs 210 of which each prolongs, in the longitudinal direction L of the cleaning system 100, a longitudinal end of the plate 20 in the upper region thereof. According to the example illustrated in FIG. 3, each tab 210 comprises an insertion orifice 211, for example for a screw or rivet not depicted in FIG. 3, for fixing the base 2 to the structure element 400.

According to the example illustrated in FIG. 3, the base 2 comprises, extending substantially perpendicular to the plate 20 from an exterior surface 205 thereof, a plurality of ribs 22 of complex shape. More specifically, with reference to the directions and orientations defined hereinabove, the ribs 22 extend as a projection from the exterior surface 205 of the plate 20, which is to say project out from that surface of the plate 20 that is situated, in the transverse direction T of the cleaning system 100, on the opposite side from the surface via which the plate 20 is secured to the vehicle. As FIG. 3 shows, each rib 22 has, in the longitudinal direction L and in the vertical direction V of the cleaning system 100, a complex shape, inclined both with respect to the longitudinal direction L and with respect to the vertical direction V of the cleaning system 100, so as to follow the increase in the longitudinal dimension of the distribution second part of the guide body. The invention also makes provision for the ribs 22 all to have the same dimension in the transverse direction T of the cleaning system 100.

According to the invention, the ribs 22 contribute to delimiting the conveying ducts 15 conveying the drying fluid in the distribution second part 11 of the guide body 1. More specifically, in the base 2, two ribs 22a, 22b arranged consecutively in the longitudinal direction L of the cleaning system 100 together delimit a circulation pathway 150 for the circulation of the drying fluid in the base 2. According to the invention, the casing 3 is configured in such a way that, when it covers the base 2, it closes off the circulation pathways 150, forming the conveying ducts 15.

This is particularly visible in FIG. 4 which illustrates, in perspective, the casing 3 of the guide body 1 viewed from the side via which it covers the base 2, which is to say, in other words, and with reference to the directions and orientations defined hereinabove, viewed from the interior side of the casing 3.

Figure 4:
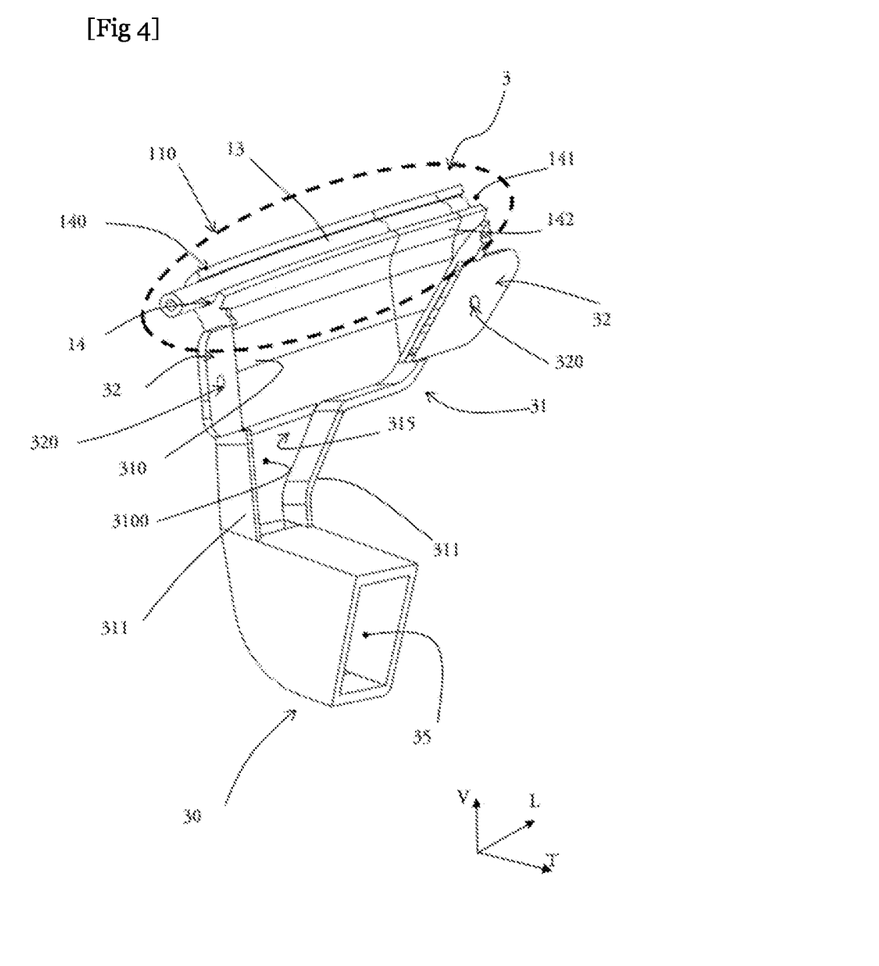
FIG. 4 is a schematic perspective view of one exemplary embodiment of a casing configured to cover a base like the one illustrated in FIG. 3 so as to form a cleaning system like the one illustrated in FIG. 2.

With reference to FIG. 4, the casing 3 comprises a first portion 30 configured to form the supply first part 10 of the guide body 1, which part is not depicted in FIG. 4, and a second portion 31 configured to cover the base 2 illustrated in FIG. 3.

With reference to the directions and orientations defined hereinabove, the first portion 30 forms the lower end of the casing 3 in the vertical direction V of the cleaning system 100, and the second portion 31 forms the upper end of the casing 3. More specifically, according to the example illustrated in FIG. 4, the first portion 30 of the casing 3 forms a hollow duct of which the main direction of elongation is parallel to the transverse direction T of the cleaning system 100, and of which one end, in the transverse direction T, is configured to accept the blower 500, not depicted in FIG. 4. At its opposite end in the transverse direction T, the first portion 30 of the casing 3 is attached to a lower end of the second portion 31 of the casing 3, which is intended to cover the base 2, the first portion 30 and the second portion 31 being designed to communicate with one another in order to allow the drying fluid to pass. More specifically, the first portion 30 has a closed cross section able of itself to guide the stream of drying fluid toward the second portion, and the second portion 31 has an open cross section able to be pressed intimately against the base 2 in order together to form the drying-fluid guide ducts.

In its second portion 31, the casing 3 comprises an end wall 310 and lateral walls 311 which extend substantially perpendicular to the end wall 310, from the longitudinal end edges thereof. The end wall 310 and the lateral walls 311 together define an open cavity 315.

It should be noted that, according to the embodiment more particularly illustrated in FIG. 4, the second portion 31 of the casing 3 comprises fixing tabs 32 configured to form, in combination with the fixing tabs 21 of the base 2, means for fixing the cleaning system 100 to the vehicle. According to the example illustrated in FIG. 4, the fixing tabs 32 extend, in the longitudinal direction L of the cleaning system 100, on either side of the lateral walls 311 and each comprise an orifice 320 configured to accept a fixing element such as a screw or rivet intended also to pass through an orifice 211 in the base 2 in order to allow the cleaning system 100 to be fixed to an element 400 of the vehicle structure.

At its upper end in the vertical direction V of the cleaning system 100, the end wall 310 of the casing 3 is attached to the aforementioned substantially cylindrical shape 140 into which, according to the example more particularly illustrated in the figures, the cleaning-fluid distribution pipe 13 is inserted. More specifically, the substantially cylindrical shape 140, of which the main direction of elongation is substantially parallel to the longitudinal direction L of the cleaning system 100, is arranged in such a way that a part 142 of its wall delimits the open cavity 315 with the end wall 310 and the lateral walls 311. More specifically still, and as shown by FIG. 4, the part 142 of the substantially cylindrical shape 140 is attached, in the longitudinal direction L of the cleaning system 100, to the end wall 310 and is delimited, at its upper end in the vertical direction V of the cleaning system 100, by the slot 141. This part 142 of the substantially cylindrical shape 140 thus forms a longitudinal upper wall of the casing 3 and of the cavity 315.

According to the invention, the shapes and dimensions of the lateral walls 311 and of the curved upper wall 142 are defined to complement the shapes and dimensions of the base 2, so that when the casing 3 is placed to cover the base 2, the base 2 closes the cavity 315. More specifically, the invention makes provision for a dimension, in the transverse direction T of the cleaning system 100, of the lateral walls 311 to be substantially equal to a dimension, in the transverse direction T, of the ribs 22 of the base 2.

It then follows that, when the casing 3 is placed covering the base 2, the free end, in the transverse direction T, of the ribs 22 comes into contact with the end wall 310 of the cavity 315. In other words, when the casing 3 is placed covering the base 2 to form the cleaning system 100, and as may have been mentioned earlier, the end wall 310 and the lateral walls 311 close off the circulation pathways 150, thus forming the drying-fluid conveying ducts 15.

Advantageously, the interior surface 3100 of the end wall 310, which is placed against the ends of the ribs 22 when the casing 3 is placed covering the base 2, is smooth, so as to ensure fluidtight closure of the conveying ducts 15 and avoid any leak of drying fluid between conveying ducts 15. In one example, the interior surface 3100 is polished.

To complement this, the invention makes provision that when the casing 3 is placed to cover the base 2 to form the distribution second part 11 of the guide body 1 of the cleaning system 100, the curved upper wall 142 becomes positioned facing the upper free ends 220, in the vertical direction V of the cleaning system 100, of each of the ribs 22. The inclination of this curved upper wall 142 then contributes to reducing the bore section through which drying fluid can pass at each of the spray openings 12. More particularly, the upper free ends 220, in the vertical direction V, of the ribs 22 extend in such a way as to lie flush with the upper end edge of the base 2 and to be positioned where the curved upper wall 142 and the end wall 310 of the casing meet. In that way, when the base of the casing are fixed to one another, each spray opening 12 is defined by the base and the ribs and by the end wall, and, where appropriate, the lateral walls, of the casing, and the curved upper wall 142 extends facing each of the spray openings to limit the bore section through which the drying fluid can pass.

With reference to the foregoing, the curved upper wall 142, which contributes on the one hand to delimiting the groove 14 and which on the other hand contributes to obstructing the spray openings 12 in order to guide the drying fluid made to exit via these openings, forms a wall that is common to the means of spraying the two fluids. This is particularly visible in FIG. 5 which shows, in close-up, a detail of the spray region 110 of the cleaning system 100 positioned in the vicinity of a sensor/transmitter 200 in order to clean a surface 250 thereof.

Figure 5:
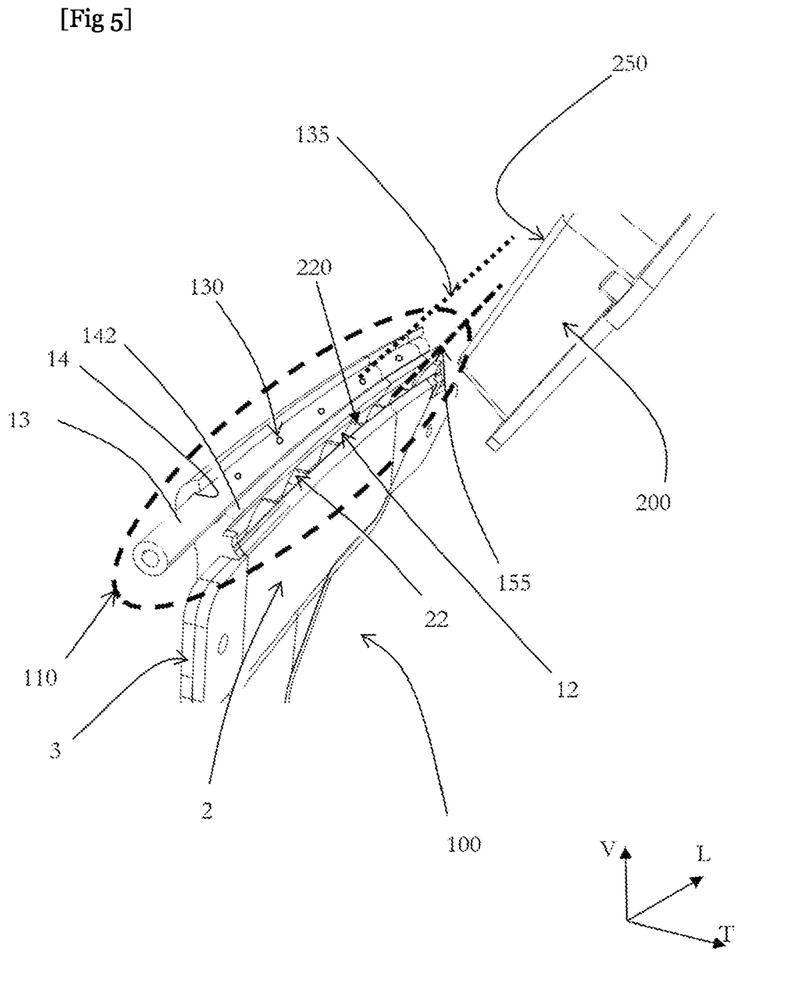
FIG. 5 is a schematic perspective view of a detail of a spray region of a cleaning system like the one illustrated in FIG. 2.

FIG. 5 again shows the base 2 and the casing 3 as well as, according to the embodiment illustrated here, the cleaning-fluid distribution pipe 13 inserted into the groove 14. This figure also again shows the upper ends, in the vertical direction V of the cleaning system 100, of the ribs 22 of the base 2, which together with the casing 3 delimit the drying-fluid spray openings 12 and conveying ducts 15. FIG. 5 also schematically indicates a number of cleaning-fluid spray orifices 130 arranged in the distribution pipe 13.

As FIG. 5 shows, the curved upper wall 142, on account of its shape and dimensions, obstructs the drying fluid leaving the spray openings 12 in the sense that the upper wall 142 reduces the bore section through which this fluid can pass at the spray openings 12. It should be noted that the reduction in the bore section of the spray openings 12 in comparison with the mean bore section of the conveying ducts 15 allows an increase in the velocity of the drying fluid as it exits the cleaning system, making it possible to obtain a jet effect in order to improve the effectiveness of the drying.

It is notable in this FIG. 5 that the curved upper wall 142 extends substantially perpendicular to the main direction of elongation of the conveying ducts 15 so that the same curved upper wall is able to reduce the bore section of all of the spray openings 12.

FIG. 5 also schematically indicates, on the one hand, a sprayed jet 135 of cleaning fluid sprayed through a spray orifice 130 and, on the other hand, a sprayed jet 155 of drying fluid sprayed via a spray opening 12. A consequence of the particular arrangement of the cleaning-fluid spray orifices 130 and of the drying-fluid spray openings 12 is that, when the cleaning system 100 is installed is near a surface 250 that is to be cleaned, the drying fluid is sprayed, thanks to the cleaning system according to the invention, between the surface 250 that is to be cleaned and the cleaning-fluid spray orifices 130. The drying fluid, in this instance air, is therefore sprayed as close as possible to the surface 250 that is to be cleaned, allowing rapid and effective drying thereof, with a reduced loss of air between the spray openings 12 and the surface 250 that is to be cleaned. This last factor notably, in the context of the example illustrated here in which the drying fluid is a stream of air generated by the blower 500, allows the blower 500 to be dimensioned to more closely meet just the requirements for a stream of drying air.

Figure 6:
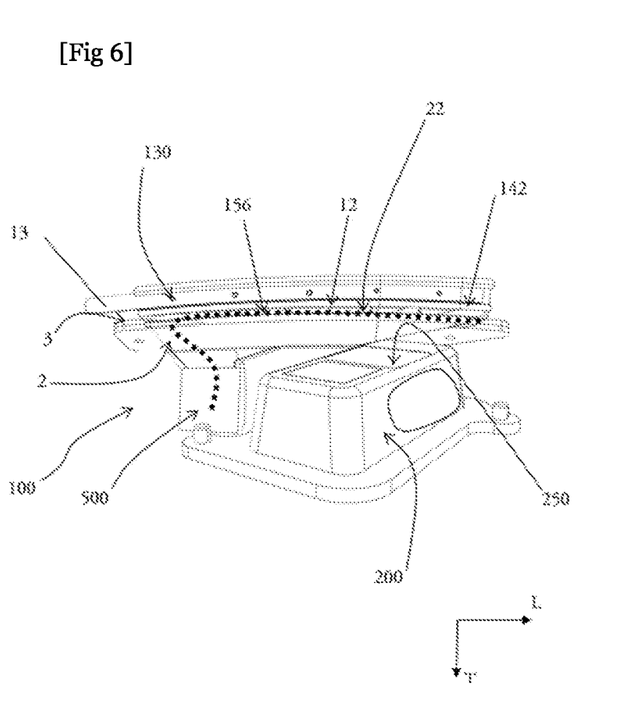
FIG. 6 is a view from above of the detail illustrated in FIG. 5.

FIG. 6 is a view from above of the detail depicted in FIG. 5. FIG. 6 again shows the sensor/transmitter 200 and its surface 250 that is to be cleaned, as well as the cleaning system 100, and the base 2 and casing 3 thereof. The blower 500 is also schematically indicated in this figure. FIG. 6 also depicts cleaning-fluid spray orifices 130 and the drying-fluid spray openings 12 delimited by the ribs 22 of the base 2 and by the curved upper wall 142 of the casing 3.

FIG. 6 also shows the path 156 of the drying fluid coming from all the drying-fluid conveying ducts 15.

As FIG. 6 shows, a consequence of the particular arrangement of the conveying ducts 15 and, in particular, of the inclined shape of the ribs 22 in the longitudinal direction L of the cleaning system 100, is that the stream of drying fluid, in this instance air, does indeed reach the entirety of the surface 250 that is to be cleaned, and does so even though the source of drying fluid, in this instance the blower 500, is offset, in the longitudinal direction L, from the spray openings 12 that spray said drying fluid.

The invention, as has just been described, therefore does indeed achieve its stated objectives by offering a simple system for cleaning and drying a surface of a sensor/transmitter of a motor vehicle. The invention also allows such a cleaning system to be installed easily in a small amount of space, while respecting the overall look of the vehicle in the vicinity of the sensor/transmitter and of the cleaning system.

The invention as has just been described is not, however, limited to the means and configurations exclusively described and illustrated, but also applies to all equivalent means or configurations and to any combination of such means or configurations. In particular, while the invention has been described here according to an example in which the cleaning fluid is conveyed in a distribution pipe 13, the invention applies to alternative instances in which the cleaning-fluid spray orifices 130 are arranged in the substantially cylindrical shape 140, the latter then not having the slot 141. In this case, the cleaning-fluid distribution duct is a substantially cylindrical distribution duct 135 pierced with the spray orifices 130 and arranged at the upper end, in the vertical direction V of the cleaning system 100, of the casing 3.

Likewise, the invention also applies to instances, not depicted in the figures, in which the base 2 of the cleaning system 100 is formed as one piece with the element 400 of the vehicle structure to which the cleaning system 100 is fixed. In this case, the ribs 22, which contribute to delimiting the drying-fluid conveying ducts 15, are arranged to project from the structure element 400, and the casing 3 is attached to the latter element, for example by fixing means 32, 320 such as those described hereinabove.

What is claimed is:

1. A cleaning system for cleaning a motor vehicle sensor/transmitter, comprising:
    a base configured to be secured to a structure of the motor vehicle;
    a casing configured to cover the base;
    spray orifices for spraying a first fluid onto the sensor/transmitter and spray openings for spraying a second fluid onto the sensor/transmitter;
    the second fluid being distinct from the first fluid, wherein the second fluid is a drying fluid;
    a guide body guiding the first fluid and the second fluid respectively toward the spray orifices of the first-fluid and the spray openings of the second fluid;
    the guide body including a supply first part configured to be connected to a source of the second fluid;
    a distribution second part including a plurality of second-fluid conveying ducts opening onto the spray openings of the second-fluid and;
    a first-fluid distribution duct arranged substantially perpendicular to the second-fluid conveying ducts;
  wherein the casing includes
    a first portion configured to be connected to the source of the second fluid;
    a second portion configured to form the distribution second part with the base, and
    the first portion and the second portion making between them a non-zero angle.

2. The cleaning system of claim 1, wherein a wall of the first-fluid distribution duct is arranged across the spray openings of the second-fluid conveying ducts in a second-fluid spray region.

3. The cleaning system of claim 1, wherein the distribution second part of the guide body has a dimension, measured in the longitudinal direction (L) of the cleaning system that differs between an edge connecting with the supply first part and an edge including the spray openings of the second-fluid.

4. The cleaning system of claim 1, wherein the openings of the second fluid are uniformly distributed along a direction of elongation of the distribution second part, substantially parallel to a longitudinal direction (L) of the cleaning system.

5. The cleaning system of claim 1, wherein the second-fluid conveying ducts are delimited by ribs projecting out from an exterior surface of the base and an interior surface of the casing is configured to be in contact with free ends of respective ribs.

6. The cleaning system of claim 5, wherein the ribs delimit the guide body within the distribution second part of the second fluid conveying ducts which are inclined with respect to a longitudinal direction (L) and to a vertical direction (V) of the cleaning system.

7. The cleaning system of claim 6, wherein each second-fluid spray opening is delimited by free ends of two ribs along the longitudinal direction (L) of the cleaning system, such that the two ribs are configured to contribute to delimiting a corresponding second-fluid conveying duct.

8. The cleaning system of claim 5, wherein the second-fluid conveying ducts are narrowed at each end via which the second fluid is sprayed from them.

9. The cleaning system of claim 1, wherein the casing includes a groove to accept a first-fluid distribution pipe in which a plurality of first-fluid spray orifices is arranged.

10. The cleaning system of claim 1, wherein the casing includes a first-fluid distribution duct of closed cross section and in which a plurality of first-fluid spray orifices is arranged.

11. A motor vehicle equipped with at least one sensor/transmitter, characterized in that the motor vehicle includes at least one sensor/transmitter-cleaning system of claim 1 for cleaning the at least one sensor/transmitter.

\* \* \* \* \*